Aug. 17, 1937.

E. LANDI

Re. 20,472

TAP DANCING SHOE

Original Filed Nov. 14, 1933

Emanuele Landi

INVENTOR

BY Victor J. Evans & Co.

ATTORNEY

Reissued Aug. 17, 1937 Re. 20,472

UNITED STATES PATENT OFFICE 20,472

TAP-DANCING SHOE

Emanuele Landi, Bronx, N. Y.

Original No. 1,997,221, dated April 9, 1935, Serial No. 697,984, November 14, 1933. Application for reissue April 8, 1937, Serial No. 135,704

6 Claims. (Cl. 36—8.3)

My invention relates to improvements in dancing shoes of the type for use particularly in tap or clog dancing.

The principal object of my invention is to provide an inexpensive durable means for incorporation in the sole of a dancing shoe and operative at will by contact with the floor to produce a snapping or similar sound for emphasizing the rhythm of the dance music and attracting the attention of the audience to selected steps in the dance.

Another object is to provide means for the purpose above set forth which is operated by pressure and by very slight effort on the part of the dancer.

To the accomplishment of the above and other objects presently appearing, a preferred embodiment of my invention has been illustrated in the accompanying drawing and will now be described in detail and defined in the claims appended hereto.

Figure 1:
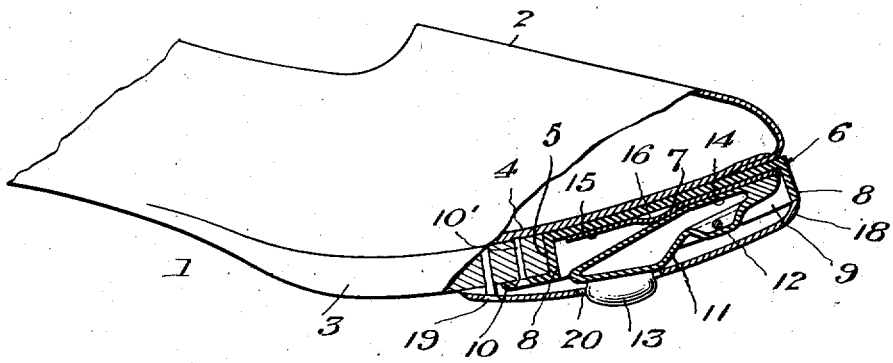
Fig. 1 is a view, partly in side elevation and partly in longitudinal section, of a portion of a dancing shoe equipped according to my invention.
Figure 2:
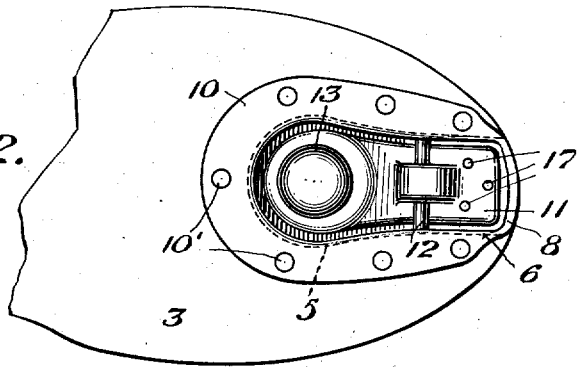
Fig. 2 is a fragmentary bottom plan view, with a cover plate, forming part of the invention, removed.
Figure 3:
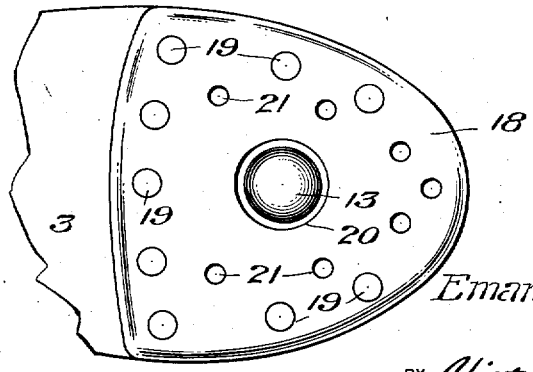
Fig. 3 is a similar view illustrating the cover plate.

Reference being had to the drawing, 1 designates the front portion of a dancing shoe including the upper 2, sole 3 and insole 4.

Incorporated in a suitable cut-out portion 5, extending rearwardly from the toe end of the sole 3, is a support or housing member 6 including an upper wall 7, end walls 8, side walls, one of which is shown at 9, and a lateral flange 10 by means of which the housing is secured to the sole 3, as by nails 10'. A tappet member 11 is mounted in the housing 6 by a pivot pin 12 for vertical rocking movement by contact with the floor. Preferably one end of the tappet member is provided with a button 13 of smooth rounded form for contacting with the floor to produce the desired rocking motion of a tappet. Tappet member 11 has an upper wall 14, a portion of which is normally substantially parallel with the sole 3 and spaced slightly therefrom, the remaining portion of said wall 14 inclining away from said wall 7 for a purpose presently clear. Intermediate the tappet member 11 and wall 7 is a sound producing member 15 preferably formed of thin sheet metal and having a centrally located convex portion 16 bearing against the slanting portion of the wall 14 so that said convex portion is compressed between the wall 7 and member 11 by rocking of the latter upwardly. The member 15 and its portion 16 are designed to produce a snapping or cracking sound when compressed by the aforesaid rocking movement of the tappet 11 and also when released by rocking movement of the tappet in the opposite direction.

Preferably the snapper member 15 has one end secured, as by nails 17, to one end of the tappet member 11 and the latter is hollow, as shown in Fig. 1, to act as a sound augmenting or amplifying chamber for the member 15. A cover plate 18 is secured over the housing 7, as by nails 19, and provided with a central aperture 20 thru which the button 13 projects and a series of apertures 21 to prevent the cover plate 18 from deadening the sound produced.

It is thought that the operation of the dancing tap of my invention will be clear from the foregoing description thereof. The resilient snapper member 15 is active for normally urging the tappet member 11 to an operable position with the button 13 thereof ready to contact the floor. Engagement of the tappet button 13 by contact with the floor is effective for compressing the snapper member 15 and for producing a snapping sound. Release of the tappet button 13 from contact with the floor is effective for releasing the snapper member 15 to produce a second snapping sound and a return of the tappet member to its operable position. It is to be understood that while a preferred embodiment of the invention has been illustrated and described, right is herein reserved to such changes in form and modification in structure as fall within the scope of the protection prayed.

What is claimed is:

1. A shoe including, a housing incorporated in the sole thereof and having an upper wall, a tappet member pivoted in said housing for rocking movement by contact with the floor, and a pressure operated sound producing member adapted to be compressed between said wall and tappet member by rocking movement of the latter.

2. A dancing tap comprising a support for attachment to a shoe, a tappet member movably mounted relatively to said support and having an operating part contactable with the floor for moving the tappet member, and a snapper member connected to be operated by movement of said tappet member to produce a snapping sound.

3. A dancing tap comprising a support for attachment to a shoe, a tappet member movably mounted relatively to said support and having an operating part contactable with the floor for moving the tappet member, and a resilient pressure operated snapper member connected to be operated by movement of said tappet member to produce a snapping sound, the resiliency of the snapper member being active for normally urging the tappet member to an operable position.

4. A dancing tap comprising a housing support for attachment to a shoe, a tappet member movably mounted in said housing support and having an operating part projecting through said housing support and contactable with the floor for moving the tappet member, and a resilient snapper member in said support located between said tappet member and a part of said support, the said snapper member being active for normally urging the tappet member to an operable position, engagement of the operating part of the tappet member by contact with the floor being effective for compressing the snapper member and producing a snapping sound and release of said contact being effective for releasing the snapping member to produce a snapping sound and a return of the tappet member to its operable position.

5. A dancing tap comprising a housing support for attachment to a shoe, a tappet member movably mounted in said housing support and having an operating part projecting through said housing support and contactable with the floor for moving the tappet member, and a resilient snapper member secured at one of its ends to said tappet member and having its other end free for engaging a part of said support, the said snapper member being active for normally urging the tappet member to an operable position, engagement of the operating part of the tappet member by contact with the floor being effective for compressing the snapper member and producing a snapping sound and release of said contact being effective for releasing the snapping member to produce a snapping sound and a return of the tappet member to its operable position.

6. A dancing tap comprising a housing support for attachment to a shoe, a tappet member oscillatably mounted in said housing support and having an operating part projecting through said housing support and contactable with the floor for oscillating the tappet member, and a snapper member in said support located between said tappet member and a part of said support, the said snapper member being active for normally urging the tappet member to an operable position, engagement of the operating part of the tappet member by contact with the floor being effective for compressing the snapper member and producing a snapping sound and release of said contact being effective for releasing the snapping member to produce a snapping sound and a return of the tappet member to its operable position.

EMANUELE LANDI.